(12) United States Patent
Vukadin et al.

(10) Patent No.: US 8,066,250 B2
(45) Date of Patent: Nov. 29, 2011

(54) MOUNTING CLIP WITH IMPROVED NOISE VIBRATION AND HARSHNESS DAMPING

(75) Inventors: Jadranka Vukadin, Windsor (CA); Igor Spasojevic, Belle River (CA); Madalina Onica, Windsor (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 218 days.

(21) Appl. No.: 12/489,625

(22) Filed: Jun. 23, 2009

(65) Prior Publication Data

US 2009/0314920 A1    Dec. 24, 2009

Related U.S. Application Data

(60) Provisional application No. 61/074,812, filed on Jun. 23, 2008.

(51) Int. Cl.
*F16M 13/00*    (2006.01)
*F16L 3/08*    (2006.01)

(52) U.S. Cl. ............. 248/562; 248/634; 248/65; 248/71

(58) Field of Classification Search ................ 248/562, 248/634, 49, 65, 68.1, 71, 74.2
See application file for complete search history.

(56) References Cited

U.S. PATENT DOCUMENTS

| | | | | |
|---|---|---|---|---|
| 4,143,577 A * | 3/1979 | Eberhardt | ...... | 411/548 |
| 4,962,916 A * | 10/1990 | Palinkas | ...... | 267/153 |
| 5,190,251 A * | 3/1993 | Bodo | ...... | 248/73 |
| 5,797,675 A * | 8/1998 | Tanner, Jr. | ...... | 362/396 |
| 6,290,201 B1 * | 9/2001 | Kanie et al. | ...... | 248/636 |
| 6,471,179 B1 * | 10/2002 | Tousi et al. | ...... | 248/635 |
| 6,786,541 B2 | 9/2004 | Haupt et al. | | |
| 6,857,697 B2 | 2/2005 | Brennan et al. | | |
| 6,893,086 B2 | 5/2005 | Bajic et al. | | |
| 7,114,771 B2 | 10/2006 | Lofy et al. | | |
| 7,168,758 B2 | 1/2007 | Bevan et al. | | |
| 7,356,912 B2 | 4/2008 | Iqbal et al. | | |
| 7,370,911 B2 | 5/2008 | Bajic et al. | | |
| 7,387,282 B2 * | 6/2008 | Kovac | ...... | 248/74.4 |
| 7,404,548 B2 * | 7/2008 | Kwilosz | ...... | 267/140.13 |
| 7,448,579 B2 * | 11/2008 | Kwilosz et al. | ...... | 248/71 |
| 2008/0216769 A1 * | 9/2008 | LaCross | ...... | 119/798 |

* cited by examiner

*Primary Examiner* — Anita M King
(74) *Attorney, Agent, or Firm* — Dobrusin & Thennisch PC

(57) ABSTRACT

A clip assembly for attaching two component assemblies while reducing NVH characteristics comprising a first clip portion; a second clip portion; and a middle clip portion that connectively spans between the first clip portion and the second clip portion; wherein the middle clip portion comprises a material that absorbs at least a portion of vibration energy that may be caused by one or both of the two component assemblies.

8 Claims, 3 Drawing Sheets

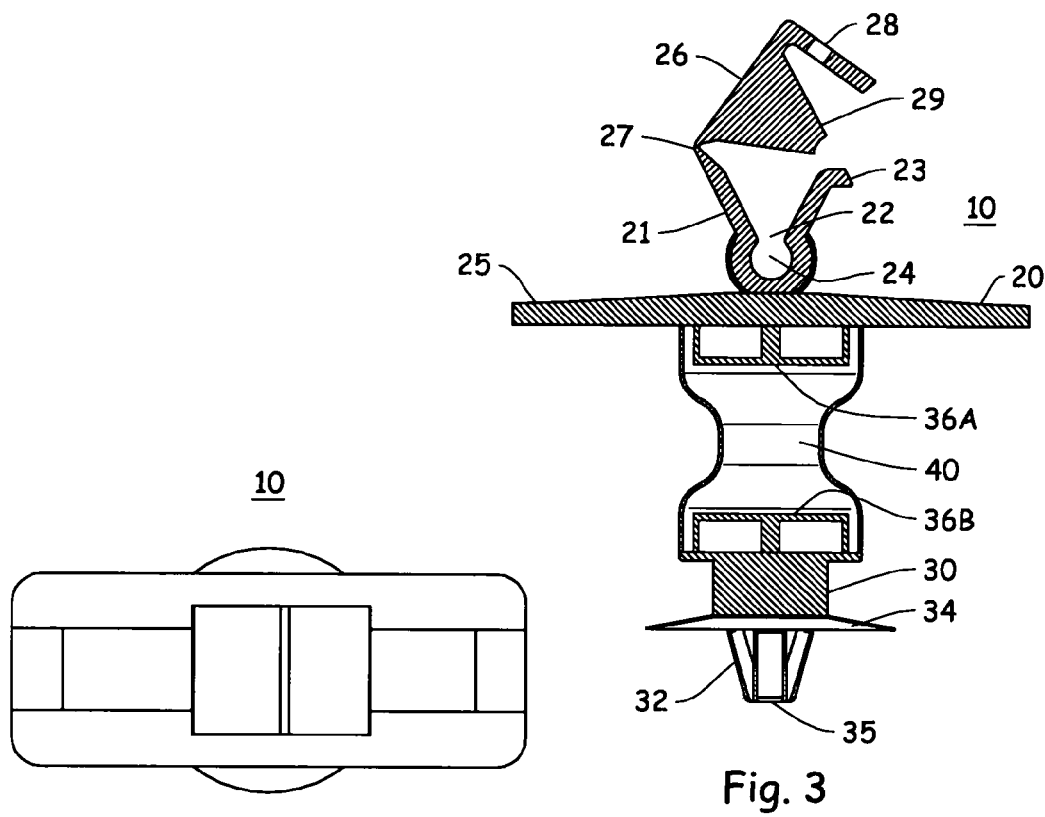
Fig. 2
Fig. 3
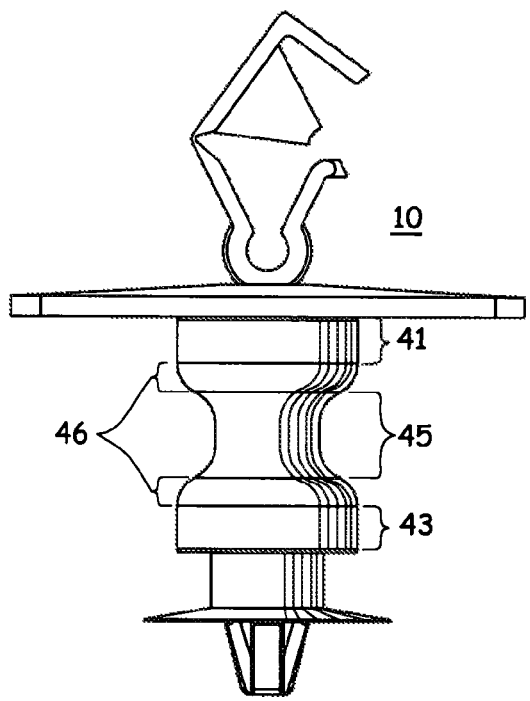
Fig. 4
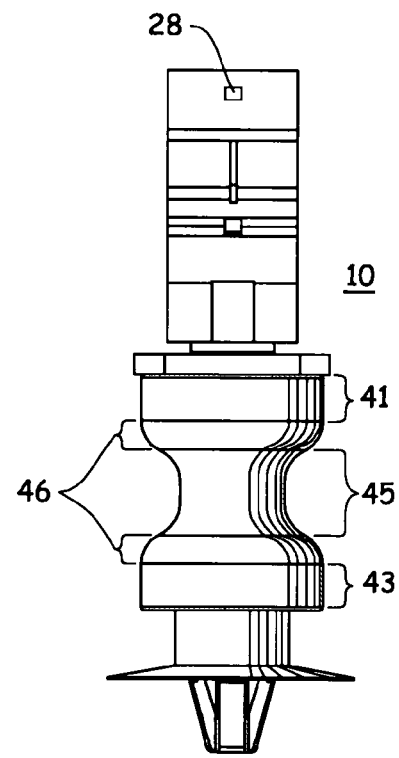
Fig. 5

MOUNTING CLIP WITH IMPROVED NOISE VIBRATION AND HARSHNESS DAMPING

CLAIM OF PRIORITY

The present application claims the benefit of the filing date of U.S. Provisional Application Ser. No. 61/074,812, filed Jun. 23, 2008, hereby incorporated by reference.

FIELD OF THE INVENTION

The present invention relates to an apparatus for attaching a device to a seat (e.g. vehicle seat, home or office furniture), more particularly to an apparatus for attaching a vibration susceptible device (e.g., a fan, a blower, a motor or any combination) to a wire structure of the seat wherein the apparatus includes a member for damping vibrations between the seat and the conditioning device.

BACKGROUND OF THE INVENTION

Some devices (e.g. fans, blowers or other air movers) may cause undesired noise and/or vibration (widely known as NVH—Noise, Vibration and Harshness) during operation. It is common to use such devices in many seating applications, such as for providing heating, cooling, ventilation, massaging, or any combination. In an effort to reduce NVH, while assuring a robust attachment method, a variety of complex designs in both the conditioning device and the attachment scheme of the device have been brought forth. It is important to provide solutions to the attachment needs that are simple to make, simple to assemble, simple to install, reduce the number of parts that are susceptible to rattling against each other, or any combination thereof. The present invention seeks to improve on the current state of the art by the use of a simplified attachment scheme that produces a robust attachment while aiding in the reduction of undesired NVH.

Examples of air movers and/or systems for which the present invention may find suitable application include those described in U.S. Pat. Nos. 7,370,911; 6,893,086; 7,356,912; 6,857,697; and 6,786,541 all of which are incorporated by reference for all purposes. Other systems that may employ air movers and/or systems for which the present invention may find suitable application include those described in U.S. Pat. Nos. 7,114,771 and 7,168,758, both incorporated by reference.

SUMMARY OF THE INVENTION

The present invention is an improved clip for attaching a conditioning device to a wire structure of a seat.

Accordingly, pursuant to a first aspect of the present invention, there is contemplated a clip assembly for attaching two component assemblies while reducing NVH characteristics including a first clip portion; a second clip portion; and a middle clip portion that connectively spans between the first clip portion and the second clip portion; the middle clip portion comprises an elastomeric material that absorbs at least a portion of vibration energy that may be caused by one or both of the two component assemblies.

The invention of the first aspect may be further characterized by one or any combination of the features described herein, such as the elastomeric material is selected from a group of Natural Rubber, Synthetic Polyisoprene, Butyl rubber, Halogenated butyl rubbers, Polybutadiene, Styrene-butadiene Rubber, Nitrile Rubber, Hydrogenated Nitrile Rubbers, Chloroprene Rubber, polychloroprene, Neoprene, Baypren, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers, Polyether Block Amides, Chlorosulfonated Polyethylene, and Ethylene-vinyl acetate; the elastomeric material has a Shore A Hardness of between 40 and 50 per ISO 868; a middle spanning portion has a diameter of 5.0 mm to 8.5 mm and a length of 2.0 mm to 10.0 mm; the first clip portion, second clip portion, or both comprise a polyamide, a polycarbonate, a polyolefin, a vinyl, or any combination thereof; the first clip portion includes a wall portion that includes a constricted neck, adjoining a cavity adapted to fit a wire therein, and a locking cover.

Accordingly, pursuant to a second aspect of the present invention, there is contemplated a clip assembly for attaching a blower to a seat while reducing NVH characteristics including a first clip portion including a wall portion that includes a constricted neck, adjoining a cavity adapted to fit a wire therein, and a locking cover; a second clip portion including a snap-fit head; and a middle clip portion that connectively spans between the first clip portion and the second clip portion; the middle clip portion comprises an elastomeric material with a Shore A Hardness of between 40 and 50 per ISO 868, further wherein the first clip portion, second clip portion, or both comprise a polyamide.

The invention of the second aspect may be further characterized by one or any combination of the features described herein, such as a middle spanning portion of the middle clip portion has a diameter of 5.0 mm to 8.5 mm and a length of 2.0 mm to 10.0 mm.

Accordingly, pursuant to a third aspect of the present invention, there is contemplated A method of installing an air mover to a seat comprising the steps of: providing a first component assembly, wherein the second component assembly comprises a wire of the seat; providing a second component assembly, wherein the first component assembly comprises at least the air mover; providing at least three clip assemblies, each clip comprising: a first clip portion; a second clip portion; and a middle clip portion that connectively spans between the first clip portion and the second clip portion; the middle clip portion comprises an elastomeric material that absorbs at least a portion of vibration energy that may be caused by one or both of the two component assemblies; attaching the first clip portion to the first component assembly; repeating the above attaching step for all the clip assemblies; attaching the second clip portion to the second component assembly; and repeating the above attaching step for all the clip assemblies, thus installing the air mover to the seat.

BRIEF DESCRIPTION OF THE DRAWINGS

FIG. 2 illustrates a top view of the clip of FIG. 1

FIG. 3 illustrates a sectional view cut through the center of the clip of FIG. 1 with the first portion in an open position.

FIG. 4 illustrates a side view of the clip of FIG. 1 with the first portion in an open position.

FIG. 5 illustrates another side view of the clip of FIG. 1 with the first portion in an open position.

DETAILED DESCRIPTION

Figure 1:
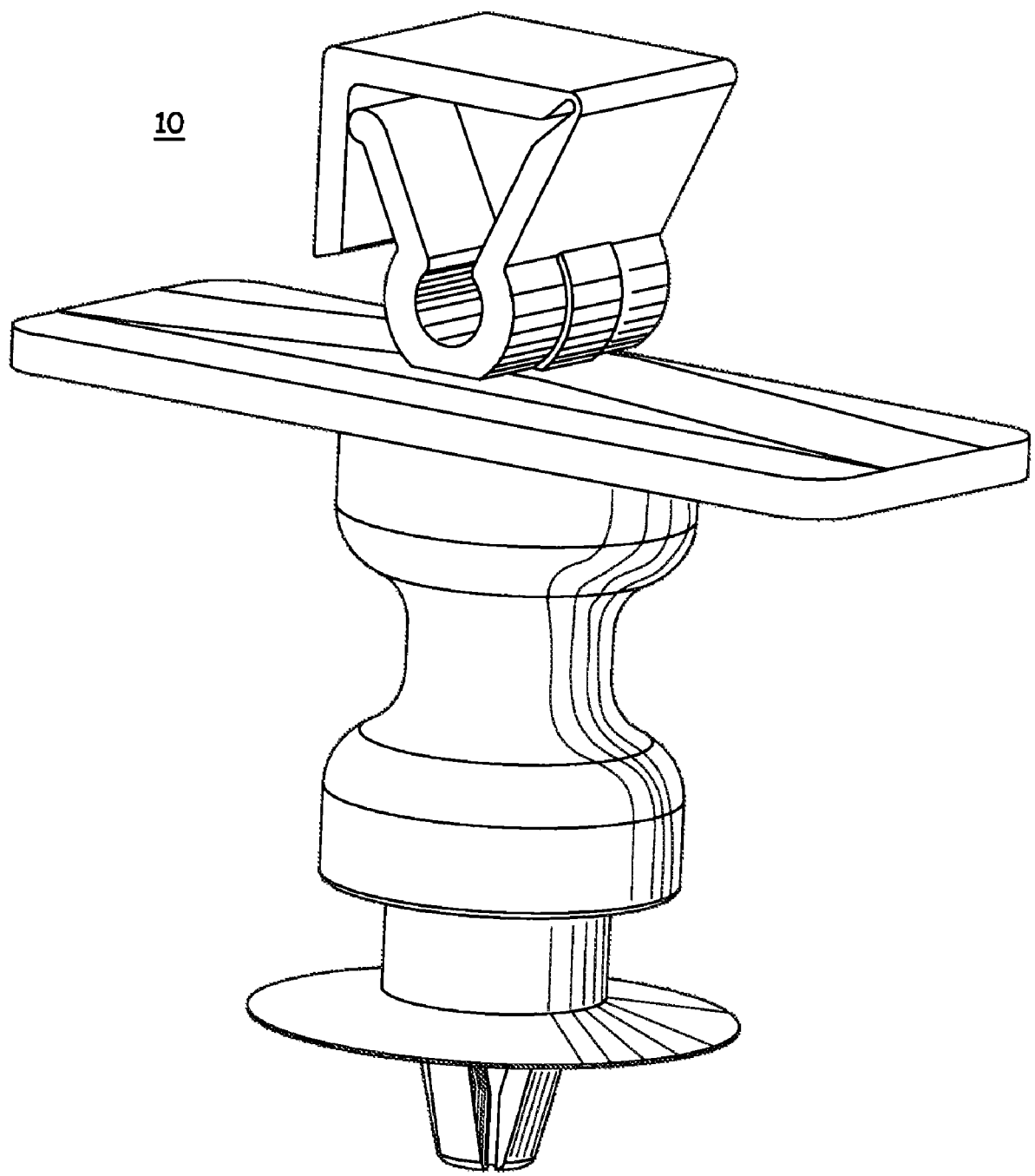
FIG. 1 illustrates a perspective view of an exemplary clip per the teachings of the present invention.

As illustratively depicted in FIGS. 1-6 (1-5 of the clip and 6 in the installed position), the present invention is directed at an improved clip used to reduce the NVH exhibited by the respective mating components.

It is contemplated that the present invention includes a clip 10 comprising a multi-piece assembly. This clip assembly 10 preferably includes a first clip portion 20, a second clip portion 30 and a connectively spanning middle clip portion 40.

The first portion 20 may be adapted to attach to a wire-like structure 50 (e.g. a wire suspension as found on some automotive seats). This first portion 20 may be constructed of any relatively ridged material, but is preferably plastic. The first portion 20 includes a wall portion 21 that includes a constricted neck 22 (which may depend from a portion that includes a tang 23 as shown, or a hole) adjoining a cavity 24 into which a wire can be snap fit. The first portion may also include a locking cover 26. As shown, the cover 26 may be connected to the wall portion via a hinge 27 (e.g., a locally thinned section). The cover 26 may also include a hole 28 (or tang) for engaging the tang 23 (or hole) and forming a mechanical interlock. Another suitable interlock may be employed in lieu of the tang/hole configuration. The cover 26 may also include a tongue 29 that projects into open space defined by the wall portion 21 (e.g., for closing the area adjacent the neck 22. In this manner, once the wire is snapped into place and the cover is locked the tongue substantially abuts the wire and helps prevent the wire from exiting the cavity 24. Optionally, the first portion may also have a laterally extending flange 25 that may provide an anti-rotational feature to the clip. This flange 25 may interface with a surrounding part of the seat structure (e.g. another part of the wire suspension).

Figure 6:
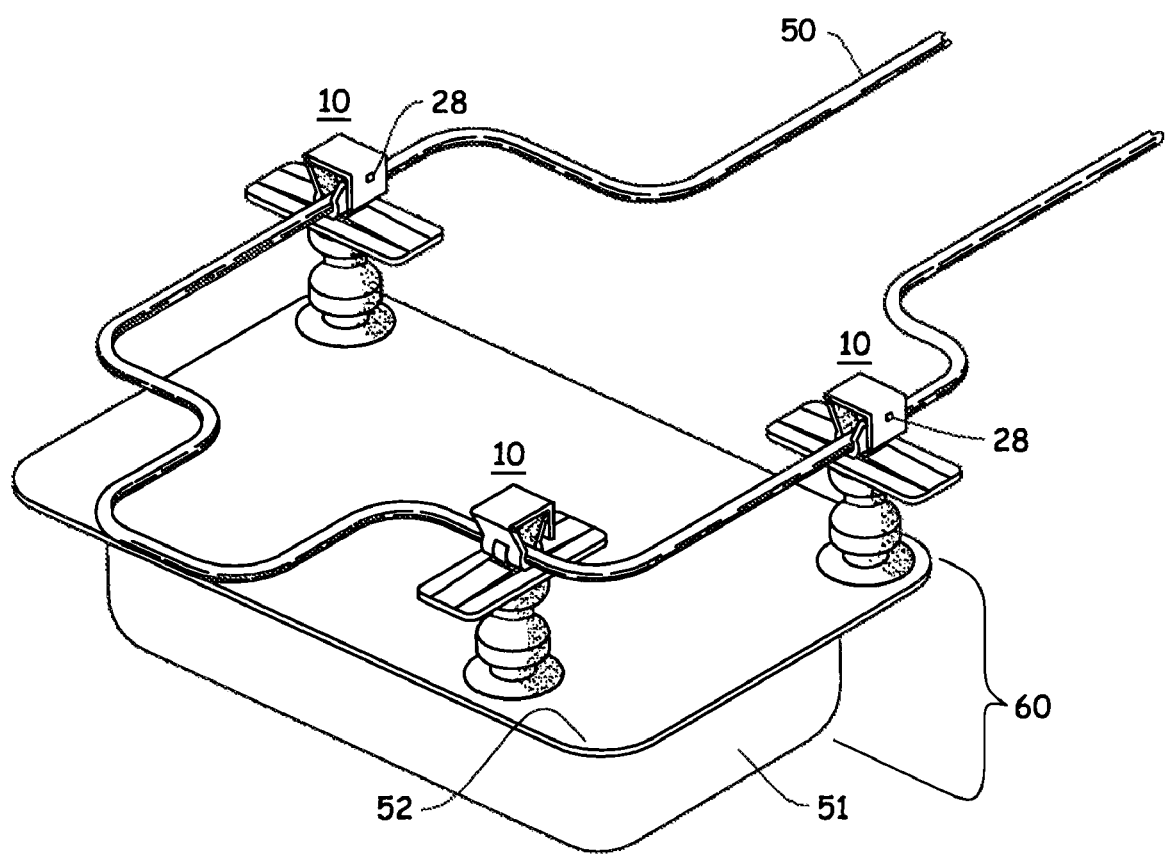
FIG. 6 illustrates a perspective view of a conditioner utilizing an exemplary clip to attach to a wire structure of a seat assembly per the teachings of the present invention.

The second portion 30 may be adapted to connect to a conditioner assembly 60, as seen in FIG. 6. Preferably, this connection is via a snap fit feature 32 (e.g., a bulbous nub that lockingly engages a hole in the assembly 60 (e.g., a hole in a motor plate 52) as seen in FIG. 6, although other attachment schemes are contemplated (e.g. screw fasteners, adhesives, rivets, etc.). This second portion 30 may be constructed of any relatively ridged material, but is preferably plastic (e.g., a thermoplastic, such as one that allows for injection molding or other temperature responsive shaping of the part). The second portion may include one or more flange 34 with a diameter or other laterally spanning dimension that is larger than the snap-fit feature (snap-fit head 35). The elastomeric member (middle section) 40 is shown as a cylinder. Other shapes are possible. The elastomeric member may be hollow along some or all of its length for receive one or both of the protrusions, or may be solid (e.g. in the case where the member 40 is over molded onto the first and/or second portions). It is also possible that the elastomeric member is configured to have a protrusion that extends into an opening of the first or second portions, for engaging and joining the portions.

Either or both of the protrusions 36A/36B may include a surface topography for increasing the surface area of the protrusion that engages the elastomeric member. For example, it may have a zig-zag topography resembling the topography of Christmas-tree fasteners. It may have a substantially constant cross sectional dimension. It may taper from one end (e.g., the end near the flange) to another (e.g., its free end). It may get larger, smaller or both from one end (e.g., the end near the flange) to another (e.g., its free end).

The middle portion 40 may connectively span between the first portion 20 and the second portion 30. This portion may function to reduce the translation of vibrations between the respective mating components (e.g. the wire structure 50 and the conditioner 60) and/or dampen (e.g. absorb) vibrations of either component. For example, the elastomeric member may be resilient and allow for elastic deformation due to lateral forces and/or vertical forces. In a preferred embodiment, the middle portion is made from a vibration dampening material, such as an elastomeric material. In an even more preferred embodiment, the middle portion is made from one or more of Natural Rubber, Synthetic Polyisoprene, Butyl rubber, Halogenated butyl rubbers, Polybutadiene, Styrene-butadiene Rubber, Nitrile Rubber, Hydrogenated Nitrile Rubbers, Chloroprene Rubber, polychloroprene, Neoprene, Baypren, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers, Polyether Block Amides, Chlorosulfonated Polyethylene, and Ethylene-vinyl acetate. In a more preferred embodiment, the elastomeric material has a Shore A Hardness of between about 30 and about 60 per ISO 868 (2.00 mm, 23.0° C.), more preferably between about 45 and 55. It also preferably has a Tensile Strength at Break (Across Flow—23° C. per ASTM D412) and a Tensile Stress (Across Flow—23° C. per ISO 37) of about 3.0 to 4.0 MPa (Mega Pascal), more preferably about 3.2 to 3.6 MPa; an Elongation at Break (Across Flow—22.8° C. per ASTM D412) of about 250% to 400%, more preferably of about 320% to 360%. The elastomeric material may be a thermoset material, preferably the elastomeric material includes a thermoplastic material having a melting temperature greater than about 100° C., more preferably greater than about 125° C., most preferably greater than 150° C. Preferably the elastomeric material is a thermoplastic (e.g. a thermoplastic elastomer such as a thermoplastic vulcanizate "TPV"). Exemplary TPVs include alloys of polyolefins (e.g. polypropylenes) and a vulcanized elastomer (e.g. an olefinic elastomer such as ethylene propylene diene rubber). One such commercially available material is offered by ExxonMobil Chemical™ under Santoprene™ TPV 111-45.

The middle portion 40 may include multiple sections with the same or differing profiles. In a preferred embodiment, the middle portion 40 includes a first mating section 41, a second mating section 43 and a middle spanning section 45, therebetween. The first mating section 41 connectively disposed to the first portion 20, the second mating section 43 connectively disposed to the second portion 30 and the middle spanning section 45 interconnecting therebetween with a tapered section nearer the interface. Preferably, the middle spanning section 45 is generally cylindrical in shape with a diameter (not including the tapered section 46) that ranges from about 4.0 mm to about 20.0 mm, more preferably from about 5.0 mm to about 10.0 mm and most preferably from about 6.0 mm to about 8.5 mm. The middle spanning section 45 also preferably has a length of about 1.0 mm to about 12.0 mm, more preferably from about 2.0 mm to about 10.0 mm, and most preferably from about 3.0 mm to about 5.0 mm. It is believed that the combination of the geometry and the material characteristics of the middle portion 40 may provide a sufficient dampening effect on the respective mating components. In a preferred embodiment, the mating components are a blower or fan 51 and a wire 50 of a seat structure (not shown).

The attachment device of the invention may be further characterized by one or more of the following features: attachment of a blower to a seat is performed without specifically configured attachment brackets or plates; the device is made without the need to sandwich separately assembled elastomeric elements between separate plate elements; any motor plate (e.g., plate 52) of the resulting assembled device can be generally planar (e.g., it requires no secondary operation to impart a surface topography such as a bead or other protrusion); the elastomeric material may be rubber or a synthetic elastomeric material having characteristics like rubber); or any combination thereof.

The first or second portion may be made of any suitable material. One preferred material is a thermoplastic material (e.g., a polyamide, a polycarbonate, a polyolefin, a vinyl, or any combination thereof.

It is possible that the middle portion, or either or both of the first or second portions may be treated (e.g., shaped, subjected to a surface treatment, or otherwise coated) for increasing or reducing its coefficient of friction.

FIG. 6 illustrates the attachment of the device herein to a wire structure. The wire structure may form part of a seat frame or seat suspension system. It may be a lumbar support guide wire. All of which are well known terms in the art.

Advantageously, systems made using the devices of the present invention have good low temperature impact properties.

As mentioned, the devices of the present invention may be employed in any of a number of different seat heating, cooling, or ventilation applications, such as a system in U.S. Pat. Nos. 7,370,911; 6,893,086; 7,356,912; 6,857,697; 6,786,541; 7,114,771 or 7,168,758 all of which are incorporated by reference for all purposes. One preferred approach has the attachment device attaching a blower or fan to a wire of a seat structure. The blower or fan 51 optionally may be coupled with a thermoelectric device that heats and/or cools in response to an electrical signal. The air from the blower or fan 51 may be blown through an insert (e.g., an insert employing a polymeric strand spacer fabric).

The present invention may be employed for any type of seat. One preferred application is for an automotive vehicle seat.

It may be possible that the elastomeric member employs one or more molded in resilient members. For example it is possible that the elastomeric member has a spring that is overmolded or coated with an elastomeric material. The first portion, the second portion or both may be co-molded (e.g., co-injection molded, such as by a two shot molding process) with the middle portion, overmolded or both to make the devices. It is also possible that the first portion, the second portion or both are formed separately and thereafter connected with the middle portion to make the devices.

The invention also contemplates a method of installing the air mover to a seat. In one illustrative example of this method, the clips described above are attached to the air mover, then to the seat (e.g. wire structure within the seat), although reversing or altering the attachment order is contemplated.

In one embodiment, the method of installing an air mover to a seat may include the steps of: providing a first component assembly, wherein the second component assembly comprises a wire of the seat; providing a second component assembly, wherein the first component assembly comprises at least the air mover; providing at least three clip assemblies, each clip comprising: a first clip portion; a second clip portion; and a middle clip portion that connectively spans between the first clip portion and the second clip portion; wherein the middle clip portion comprises an elastomeric material that absorbs at least a portion of vibration energy that may be caused by one or both of the two component assemblies; attaching the first clip portion to the first component assembly; repeating the above attaching step for all the clip assemblies; attaching the second clip portion to the second component assembly; and repeating the above attaching step for all the clip assemblies, thus installing the air mover to the seat.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A clip assembly for attaching two component assemblies while reducing NVH characteristics, comprising:
   a first clip portion;
   a second clip portion; and
   a middle clip portion comprised of an elastomeric material with a Shore A Hardness of between 40 and 50 per ISO 868 that connectively spans between the first clip portion and the second clip portion, connected to the first and second clip portions via protrusions disposed on the first and second clip portions;
   wherein the middle clip portion absorbs at least a portion of vibration energy that may be caused by one or both of the two component assemblies, further wherein the first clip portion, second clip portion, or both comprise a polyamide, a polycarbonate, a polyolefin, a vinyl, or any combination thereof and wherein a middle spanning portion has a diameter of 5.0 mm to 8.5 mm and a length of 2.0 mm to 10.0 mm.

2. The clip assembly according to claim 1, wherein the elastomeric material is selected from a group of Natural Rubber, Synthetic Polyisoprene, Butyl rubber, Halogenated butyl rubbers, Polybutadiene, Styrene-butadiene Rubber, Nitrile Rubber, Hydrogenated Nitrile Rubbers, Chloroprene Rubber, polychloroprene, Neoprene, Baypren, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers, Polyether Block Amides, Chlorosulfonated Polyethylene, and Ethylene-vinyl acetate.

3. The clip assembly according to claim 1, wherein the first clip portion includes a laterally extending flange that provide an anti-rotational feature to the clip assembly.

4. The clip assembly according to claim 1, wherein the first clip portion includes a wall portion that includes a constricted neck, adjoining a cavity adapted to fit a wire therein, and a locking cover.

5. The clip assembly according to claim 1, wherein the second clip portion includes a snap-fit head.

6. A clip assembly for attaching a blower to a seat while reducing NVH characteristics, comprising:
   a first clip portion including a wall portion that includes a constricted neck, adjoining a cavity adapted to fit a wire therein, and a locking cover;
   a second clip portion including a snap-fit head; and
   a middle clip portion that connectively spans between the first clip portion and the second clip portion;
   wherein the middle clip portion comprises an elastomeric material with a Shore A Hardness of between 40 and 50 per ISO 868, further wherein the first clip portion, second clip portion, or both comprise a polyamide.

7. The clip assembly according to claim 6, wherein a middle spanning portion of the middle clip portion has a diameter of 5.0 mm to 8.5 mm and a length of 2.0 mm to 10.0 mm.

8. A method of installing an air mover to a seat comprising the steps of:
- providing a first component assembly, wherein the first component assembly comprises a wire of the seat;
- providing a second component assembly, wherein the second component assembly comprises at least the air mover;
- providing at least three clip assemblies, each clip comprising:
  - a first clip portion;
  - a second clip portion; and
  - a middle clip portion comprised of an elastomeric material with a Shore A Hardness of between 40 and 50 per ISO 868 that connectively spans between the first clip portion and the second clip portion, connected to the first and second clip portions via protrusions disposed on the first and second clip portions;
  - wherein the middle clip portion absorbs at least a portion of vibration energy that may be caused by one or both of the two component assemblies, further wherein the first clip portion, second clip portion, or both comprise a polyamide, a polycarbonate, a polyolefin, a vinyl, or any combination thereof;
- attaching the first clip portion to the first component assembly;
- repeating the above attaching step for all the clip assemblies;
- attaching the second clip portion to the second component assembly; and
- repeating the above attaching step for all the clip assemblies, thus installing the air mover to the seat.

* * * * *